(12) United States Patent
Shi et al.

(10) Patent No.: US 11,974,152 B2
(45) Date of Patent: Apr. 30, 2024

(54) DEACTIVATED SECONDARY COMPONENT CARRIER (SCC) MEASUREMENT

(71) Applicant: ZTE Corporation, Guangdong (CN)

(72) Inventors: Xiaojuan Shi, Guangdong (CN); Qian Yang, Guangdong (CN); Jing Liu, Guangdong (CN)

(73) Assignee: ZTE Corporation, Guangdong (CN)

( * ) Notice: Subject to any disclaimer, the term of this patent is extended or adjusted under 35 U.S.C. 154(b) by 481 days.

(21) Appl. No.: 17/180,250

(22) Filed: Feb. 19, 2021

(65) Prior Publication Data

US 2021/0185553 A1 Jun. 17, 2021

Related U.S. Application Data

(63) Continuation of application No. PCT/CN2018/101717, filed on Aug. 22, 2018.

(51) Int. Cl.
*H04W 24/10* (2009.01)
*H04L 5/00* (2006.01)

(52) U.S. Cl.
CPC ........... *H04W 24/10* (2013.01); *H04L 5/0053* (2013.01); *H04L 5/0098* (2013.01)

(58) Field of Classification Search
CPC ..... H04L 5/0053; H04L 5/0098; H04W 24/10
See application file for complete search history.

(56) References Cited

U.S. PATENT DOCUMENTS

| 2013/0242789 | A1* | 9/2013 | Narasimha | ............ | H04W 24/10 |
| | | | | | 370/252 |
| 2015/0215799 | A1 | 7/2015 | Kazmi et al. | | |
| 2015/0327054 | A1* | 11/2015 | Callender | ............. | H04W 24/10 |
| | | | | | 370/329 |
| 2016/0249407 | A1 | 8/2016 | Yu et al. | | |
| 2018/0049047 | A1* | 2/2018 | Lin | ...................... | H04L 27/2602 |
| 2018/0092085 | A1* | 3/2018 | Shaheen | ................ | H04W 36/14 |
| 2018/0109987 | A1* | 4/2018 | Xu | ........................ | H04W 16/14 |
| 2019/0124690 | A1* | 4/2019 | Siomina | ................ | H04W 24/10 |
| 2019/0149307 | A1* | 5/2019 | Siomina | ................ | H04W 16/14 |
| | | | | | 370/252 |
| 2019/0305912 | A1* | 10/2019 | Kazmi | ............. | H04W 72/0453 |

(Continued)

FOREIGN PATENT DOCUMENTS

| CN | 104917583 A | 9/2015 |
| CN | 106797289 A | 5/2017 |

(Continued)

OTHER PUBLICATIONS

Chinese Office Action for Application No. 2018800991068, dated Jul. 20, 2022, 15 pages with unofficial translation.

(Continued)

*Primary Examiner* — Kent Krueger

(74) *Attorney, Agent, or Firm* — Perkins Coie LLP

(57) ABSTRACT

Methods, systems, and devices related to digital wireless communication are described. A method of wireless communication includes configuring, at a first communication node, a subset of a plurality of measurement timing occasions for a second communication node to perform deactivated secondary Component Carrier (SCC) measurement, and causing the second communication node to perform deactivated SCC measurement based, at least in part, on the subset of measurement timing occasions.

18 Claims, 3 Drawing Sheets

(56) References Cited

U.S. PATENT DOCUMENTS

2019/0306915 A1* 10/2019 Jin .................. H04W 76/28
2021/0314785 A1* 10/2021 Raghavan ............ H04W 76/11

FOREIGN PATENT DOCUMENTS

WO   2014025302 A1   2/2014
WO   2015147733 A1   10/2015

OTHER PUBLICATIONS

Nokia et al. "Network-indicated measurements on deactivated NR SCells" 3GPP TSG-RAN WG4 Meeting #86 R4-1802457, Athens, Greece, Feb. 26-Mar. 2, 2018, 5 pages.
CNIPA, Notification to Complete Formalities of Registration for Chinese Application No. 201880099106.8, dated Feb. 15, 2023, 4 pages with unofficial translation.
International Search Report and Written Opinion in International Application No. PCT/CN2018/101717, dated May 20, 2019, 6 pages.
Ericsson, "Further consideration on interruptions for SA and NSA NR" 3GPP TSG-RAN WG4 Meeting #AH1807 R4-1808704, Jun. 25, 2018, 4 pages.
Nokia et al., "Consideration on measurement gap in NG-EN DC" 3GPP TSG-RAN WG2 Meeting #102 R2-1808598 May 11, 2018, 3 pages.

* cited by examiner

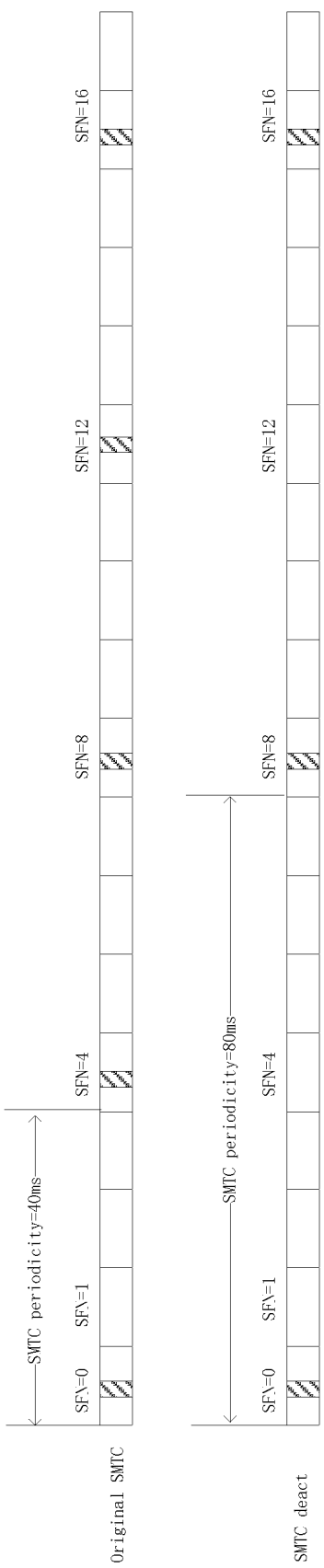
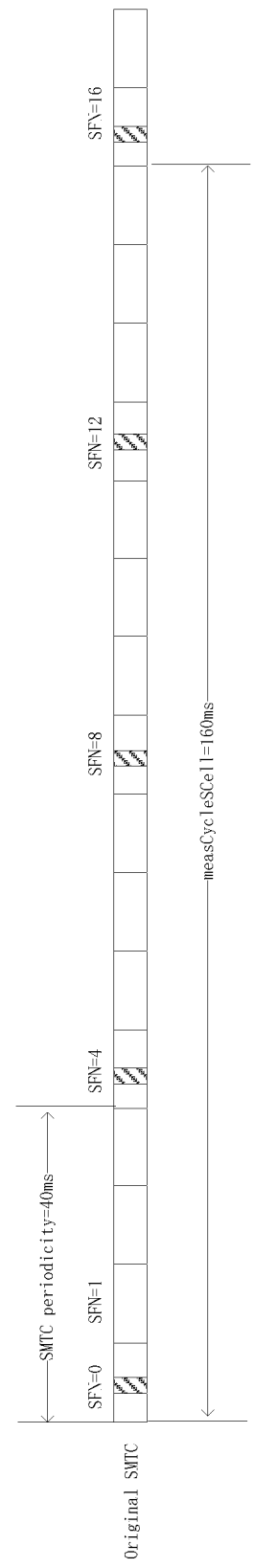
FIG. 1
FIG. 2

DEACTIVATED SECONDARY COMPONENT CARRIER (SCC) MEASUREMENT

CROSS-REFERENCE TO RELATED APPLICATIONS

This application is a continuation of and claims priority to International Patent Application No. PCT/CN2018/101717, filed on Aug. 22, 2018, the contents of which are incorporated herein by reference in their entirety.

TECHNICAL FIELD

This patent document is directed generally to digital wireless communications.

BACKGROUND

Mobile communication technologies are moving the world toward an increasingly connected and networked society. The rapid growth of mobile communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to support higher data-rates, large number of connections, ultra-low latency, high reliability and other emerging business needs.

SUMMARY OF PARTICULAR EMBODIMENTS

This document relates to methods, systems, and devices related to digital wireless communication, and more specifically, to performing deactivated secondary Component Carrier (SCC) measurements.

In one exemplary aspect, a method of wireless communication is disclosed. The method includes configuring, at a first communication node, a subset of measurement timing occasions based at least partly on a plurality of measurement timing occasions, for a second communication node to perform deactivated secondary Component Carrier (SCC) measurement. In some embodiments, the method also includes causing the second communication node to perform deactivated SCC measurement based, at least in part, on the subset of measurement timing occasions.

In some embodiments, the first communication node includes a base station. In some embodiments, configuring the subset of measurement timing occasions comprises configuring the subset of measurement timing occasions per measurement object.

In some embodiments, the plurality of measurement timing occasions corresponds to first Synchronization Signal/Physical Broadcast Channel block measurement timing configurations (SMTC). In some embodiments, configuring the subset of measurement timing occasions comprises configuring second SMTC to indicate the subset of measurement timing occasions. In some embodiments, a periodicity of the second SMTC is longer than a periodicity of the first SMTC. In some embodiments, configuring the subset of measurement timing occasions comprises configuring a bitmap to indicate the subset of measurement timing occasions. In some embodiments, the bitmap has a maximum length of N and wherein the leftmost M bits of the bitmap are used to indicate the subset of measurement timing occasions. In some embodiments, wherein the value of M is determined based, at least in part, on a measurement cycle and a periodicity of the first SMTC.

In some embodiments, the first communication node provides New Radio (NR) network access in dual connection (DC) mode. In some embodiments, the method further comprises communicating, from the first communication node to a third communication node, the configured subset of measurement timing occasions. In some embodiments, communicating the configured subset of measurement timing occasions comprises communicating, over an inter-node interface, an Absolute Radio Frequency Channel Number (ARFCN) of Synchronization Signal/Physical Broadcast Channel blocks (SSBs) and a configured subset of first SMTC durations. In some embodiments, communicating the configured subset of measurement timing occasions comprises communicating, over an inter-node interface, a configured subset of first SMTC durations and corresponding serving cell index. In some embodiments, communicating the configured subset of the first SMTC durations comprises communicating at least one of (a) second SMTC that indicate the configured subset of the first SMTC durations or (b) the first SMTC, a bitmap for indicating the configured subset of the first SMTC durations, and a measurement cycle. In some embodiments, the method further comprises communicating, from a Central Unit (CU) to a Distribution Unit (DU), the configured subset of measurement timing occasions received from the third communication node, in CU-DU split mode of the first communication node.

In another exemplary aspect, a method of wireless communication includes performing, by a second communication node, deactivated SCC measurement in accordance with a subset of measurement timing occasions, wherein the subset of measurement timing occasions is configured, by a first communication node or a third communication node, based at least partly on a plurality of measurement timing occasions.

In some embodiments, the second communication node includes a terminal. In some embodiments, if a measurement cycle for performing the deactivated SCC measurement is longer than a threshold and if the subset of measurement timing occasions includes all of the plurality of measurement timing occasions, then the second communication node is only allowed to cause interruptions to serving cells which are in the same Frequency Range (FR) as the deactivated SCC.

In some embodiments, if a measurement cycle for performing the deactivated SCC measurement is longer than a threshold and if the subset has fewer measurement timing occasions than the plurality of the measurement timing occasions, then (a) the second communication node is only allowed to cause interruptions to serving cells which are in the same FR as the deactivated SCC and (b) the second communication node is only allowed to cause interruptions in accordance with the subset of measurement timing occasions.

In some embodiments, the method further comprises communicating, from the second communication node to at least one of the first communication node or a third communication node, an indication of benefit. In some embodiments, the method further comprises receiving, at the second communication node, a responding indication in response to the indication of benefit, wherein if the responding indication indicates a particular value: the second communication node is only allowed to cause interruptions to serving cells which are in the same FR as the deactivated SCC. In some embodiments, the first communication node communicates to a third communication node the responding indication in response to the indication of benefit, wherein the first communication node is a master node (MN) and the third communication node is a second node (SN), both operating in at least one of E-UTRA-NR Dual Connectivity (EN-DC), NG-RAN E-UTRA-NR Dual Connectivity (NGEN-DC), or NR-NR Dual Connectivity (NR-NR-DC) mode.

In some embodiments, the method further comprises communicating, from the second communication node to at least one of the first communication node or a third communication node, a first indication of benefit corresponding to a first FR and a second indication of benefit corresponding to a second FR. In some embodiments, at least one of the first communication node or a third communication node determines (a) a first responding indication for responding to the first indication of benefit and (b) a second responding indication for responding to the second indication of benefit. In some embodiments, the method further comprises receiving, at the second communication node, a first responding indication in response to the first indication of benefit, wherein if the first responding indication indicates a particular value: the second communication node is only allowed to cause interruptions to serving cells which are in the first FR. In some embodiments, the method further comprises receiving, at the second communication node, a second responding indication in response to the second indication of benefit, wherein if the second responding indication indicates a particular value: the second communication node is only allowed to cause interruptions to serving cells which are in the second FR. In some embodiments, the first communication node communicates to a third communication node at least one of the first responding indication for responding to the first indication of benefit or the second responding indication for responding to the second indication of benefit, wherein the first communication node is a master node (MN) and the third communication node is a second node (SN), both operating in at least one of E-UTRA-NR Dual Connectivity (EN-DC), NG-RAN E-UTRA-NR Dual Connectivity (NGEN-DC), or NR-NR Dual Connectivity (NR-NR-DC) mode.

In another exemplary aspect, an apparatus for wireless communication that is configured or operable to perform the above-described methods is disclosed.

In yet another exemplary aspect, the above-described methods are embodied in the form of processor-executable code and stored in a computer-readable program medium.

The above and other aspects and their implementations are described in greater detail in the drawings, the descriptions, and the claims.

BRIEF DESCRIPTION OF THE DRAWINGS

FIG. 1 illustrates an example of timing configuration for deactivated SCC measurement, in accordance with some embodiments of the presently disclosed technology.

FIG. 2 illustrates another example of timing configuration for deactivated SCC measurement, in accordance with some embodiments of the presently disclosed technology.

DETAILED DESCRIPTION

Figure 3:
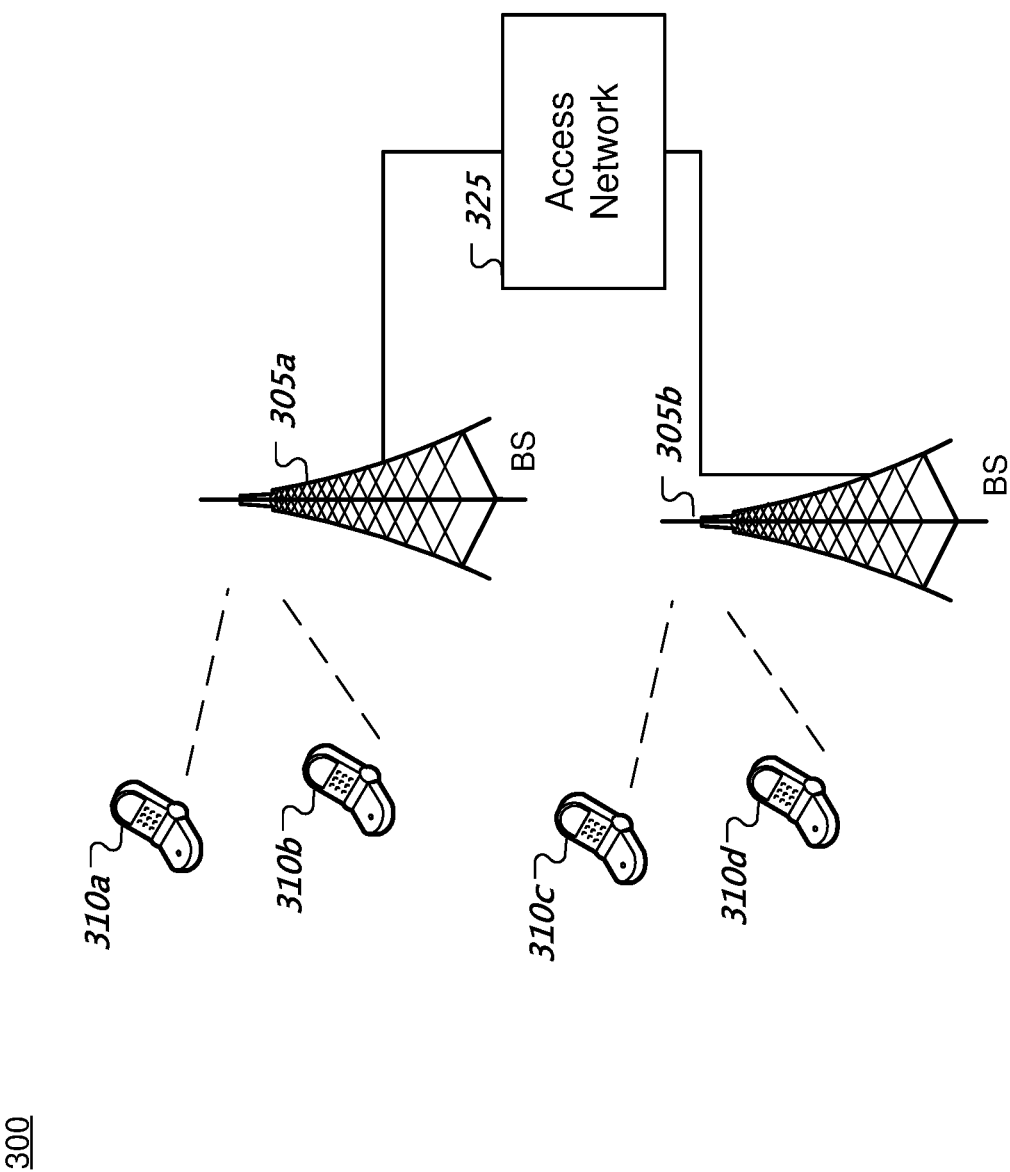
FIG. 3 shows an example of a wireless communication system where techniques in accordance with one or more embodiments of the present technology can be applied.

The technology and examples of implementations in this document can be used to improve performance in multiuser wireless communication systems. The term "exemplary" is used to mean "an example of" and, unless otherwise stated, does not imply an ideal or a preferred embodiment. Section headers are used in the present document to facilitate understanding and do not limit the disclosed technology in the sections only to the corresponding section.

Carrier Aggregation (CA) is introduced in Evolved Universal Terrestrial Radio Access (E-UTRA). In CA, two or more Component Carriers (CCs) are aggregated to support wider transmission bandwidth(s). Among the multiple serving cells in CA, there is one Primary Cell (PCell) which provides security input and Non-Access Stratum (NAS) mobility information. One or more other serving cells are called Secondary Cells (SCells). In the downlink (DL), the carrier corresponding to the PCell is the Downlink Primary Component Carrier (DL PCC) while the carrier corresponding to a SCell is a Downlink Secondary Component Carrier (DL SCC). Similarly, in the uplink (UL), the carrier corresponding to the PCell is the Uplink Primary Component Carrier (UL PCC) while the carrier corresponding to a SCell is an Uplink Secondary Component Carrier (UL SCC). In CA, SCell can be activated and deactivated.

Typically, when an SCell is deactivated, an associated User Equipment (UE) terminal can perform measurement on the SCC corresponding to the SCell (hereinafter "deactivated SCC") less frequently, e.g., less frequently than performing measurement on the SCC when the SCell is activated. A measurement cycle dedicated to deactivated SCC (e.g., MeasCycleSCell) can be configured for the UE.

If a long MeasCycleSCell (e.g., 640 ms) is configured, to save on power consumption, typically the UE can power down unused radio frequency (RF) chain or unused part(s) of the RF chain (e.g. the RF chain or part(s) of the RF chain used for the deactivated SCell) when not performing measurement on the deactivated SCC. In other words, the UE can only power up the unused RF chain or the unused part(s) of the RF chain on occasion(s) within the MeasCycleSCell when it is scheduled, configured, or otherwise determined to perform measurement on the deactivated SCC. During the power-up and power-down process, there can be interruptions on the PCell and other activated SCells. The interruptions are generally considered acceptable for the long periodicity of MeasCycleSCell, as long as the UE performs measurement according to certain specified interruption requirement.

If a short MeasCycleSCell (e.g., 160 ms) is configured, whether to allow interruption when performing measurement on deactivated SCC depends on network (NW) control (e.g., control via one or more base stations). To facilitate the NW control, the UE can report an indication (e.g., benefitsFromInterruption) in UE capability to inform one or more associated base stations that the UE can benefit on power consumption if interruption is allowed (e.g., benefitsFromInterruption=TRUE). With the reception of the indication benefitsFromInterruption set to TRUE, the NW may set an indication (e.g., allowInterruptions) to TRUE so that the UE can save its power when it measures deactivated SCC. In other words, if interruption is allowed by the NW, the UE can power down the unused RF chain or the unused part(s) of the RF chain when the SCell is deactivated and power up the unused RF chain or the unused part(s) of the RF chain only on occasions within the MeasCycleSCell when it is scheduled, configured, or otherwise determined to perform measurement on the deactivated SCC. Otherwise, to avoid interruptions on PCell and other activated SCells, the UE should keep the unused RF chain or the unused part(s) of the RF chain powered on even if the SCell is deactivated.

The presently disclosed technology addresses the measurement on deactivated SCC(s) in situations where UE is operating in accordance with New Radio (NR) standard. In NR, UE performs measurements based on Synchronization Signal/Physical Broadcast Channel (SS/PBCH) blocks. Unlike Cell Reference Signal (CRS) in E-UTRA that is present in each slot, SS/PBCH blocks (hereinafter "SSB") in NR are not present in every slot. Instead, SSBs are periodically transmitted. The NW configures SSB measurement timing configurations (SMTC), i.e., timing occasions at which the UE measures SSBs, for the UE. The SMTC is configured per measurement object and includes Periodicity, Offset, and Duration. The UE sets up the SMTC in accordance with the received Periodicity and Offset. The first subframe of each SMTC occasion occurs at a System Frame Number (SFN) and subframe of the NR SpCell that satisfy the following conditions:

SFN mod $T$=(FLOOR(Offset/10))mod $T$;

if the Periodicity is larger than sf5(5 number of subframes):

subframe=Offset mod 10;

else:

subframe=Offset or (Offset+5);

with $T$=CEIL(Periodicity/10).

In accordance with some embodiments, the UE performs SSB based measurement within configured SMTC duration (s). If interruption due to measurement on deactivated SCC is allowed, illustratively, the two approaches can apply:

Approach1: Interruptions are allowed in a time window before, after, or straddling every SMTC duration.

Approach2: Interruptions are allowed only at some network configured subset of the SMTC durations, where interruptions are allowed in a time window before, after, or straddling each of the subset of the SMTC durations.

For both approaches, a missed Acknowledgement/Unacknowledgement (ACK/NACK) rate and the maximum length of the interruption window before, after, or straddling individual SMTC durations can be specified.

Specifically for Approach2, in some embodiments, the NW (e.g., via one or more associated base stations) can indicate to the UE the subset of the SMTC durations where interruptions are allowed in a window before, after, or straddling individual SMTC durations. The NW can configure the subset of the SMTC durations per measurement object. Illustratively, the following two methods can be used to indicate the subset of the SMTC durations:

Approach2—Option1:

Configure an additional SMTC to indicate the subset of the SMTC durations. The periodicity in the additional SMTC must be longer than the periodicity indicated in the original SMTC.

For example, in NR, the periodicity of SMTC can be one the following: 5 sf, 10 sf, 20 sf, 40 sf, 80 sf, or 160 sf (where sf means subframe). Accordingly, if the periodicity of the original SMTC, which is configured in a measurement object, is 10 sf, then the periodicity of the additional SMTC, which is configured additionally in the same measurement object, can be 20 sf, 40 sf, 80 sf, or 160 sf.

FIG. 1 illustrates an SMTC configuration example in accordance with Option1. With reference to FIG. 1, the original SMTC is configured as: Periodicity=40 ms, Offset=6, Duration=3 ms. The additional SMTC (denoted SMTC_deact in FIG. 1) can be configured as: Periodicity=80 ms, Offset=6, Duration=3 ms.

In this way, as illustrated in FIG. 1, the UE can perform measurement on the deactivated SCC in SMTC durations of SFN=0, 8, 16, etc. Accordingly, the interruptions on PCell and other activated SCells will only occur in a window before, after, or straddling each of these SMTC durations. For SMTC durations of SFN=4, 12, etc., there will be no interruptions.

Approach2—Option2:

Configure a bitmap (denoted SMTC_deact_bitmap) with a maximum length N to indicate the subset of the SMTC durations. For a particular measurement object, only the left most M bits of the bitmap are valid, and M can be calculated by, for example, dividing MeasCycleSCell by the periodicity of the SMTC, where the MeasCycleSCell and the SMTC are configured on this particular measurement object. The MeasCycleSCell is set to be a multiple of the periodicity of the SMTC. When performing measurement on the deactivated SCC, the UE sets up the measurement cycle in accordance with received MeasCycleSCell and received Offset of the SMTC. Illustratively, the first SFN of each measurement cycle occurs at an SFN of the NR SpCell that satisfies the following conditions:

SFN mod $T$=(FLOOR(Offset/10))mod $T$;

with $T$=CEIL(Periodicity/10).

FIG. 2 illustrates an SMTC configuration example in accordance with Option2. With reference to FIG. 2, the SMTC is configured as: Periodicity=40 ms, Offset=6, Duration=3 ms. The MeasCycleSCell is configured as: MeasCycleSCell=160 ms. The UE can set up the SMTC and measurement cycle accordingly.

In the example of FIG. 2, M=160 ms/40 ms=4. Assuming N=16, then the SMTC_deact_bitmap can be configured as {1010000000000000}. In this example, only the left most M=4 bits (i.e., "1010") are valid, where "1" indicates a selected SMTC duration for the subset. Therefore, the UE performs measurement on the deactivated SCC in SMTC durations of SFN=0, 8, 16, etc. The interruptions on PCell and other activated SCells will only occur in a window before, after, or straddling each of these SMTC durations. For SMTC durations of SFN=4, 12, etc., there will be no interruptions.

A wider frequency range can be used in NR. For instance, in NR R15, frequency up to 52.6 GHz can be used. Requirements on radio frequency (RF) properties are in many cases defined separately than for different frequency ranges (FR). In NR, two FRs are defined: FR1 (450 MHz~6 GHz) and FR2 (24.5 GHz~52.6 GHz). Due to the large separation between the ranges of FR1 and FR2, typically FR1 and FR2 will not share the same RF chain with state-of-the-art RF technology.

A UE may be configured to operate with a single connection or a dual connection (DC). During the operation of DC, the UE can be configured to utilize resources provided by two different nodes (e.g., base stations). One node acts as the master node (MN) and the other as the second node (SN). In NR, the following types of DC operations can apply:

E-UTRA-NR Dual Connectivity (EN-DC): Evolved Node B (eNB) acts as the MN and Next Generation NodeB (gNB) acts as the SN. eNB provides the E-UTRA access and gNB provides NR access. The eNB is connected to the Evolved Packet Core (EPC) via the S1 interface and to the gNB via the X2 interface.

NG-RAN E-UTRA-NR Dual Connectivity (NGEN-DC): eNB acts as the MN and gNB acts as the SN. The eNB is connected to the 5G Core (5GC) via the NG interface and to the gNB via the Xn interface.

NR-E-UTRA Dual Connectivity (NE-DC): gNB acts as the MN and eNB acts the SN. The gNB is connected to the 5GC via the NG interface and to the eNB via the X2 interface.

NR-NR Dual Connectivity (NR-NR-DC): One gNB acts as the MN and is connected to the 5GC via the NG interface. The other gNB acts as the SN and is connected to the MN via the Xn interface.

In accordance with some embodiments, in DC, the node that provides NR access configures subsets of the SMTC durations per measurement object and the configured subsets of the SMTC durations are transferred from one node to the other. Examples for transferring of the configured subsets of SMTC durations for different types of DC are described below:

For EN-DC or NGEN-DC, SN provides NR access. So, the SN can configure the subset of the SMTC durations per measurement object. For EN-DC, MN can only operate on FR1 while SN can operate on FR1 and FR2. When performing measurement on deactivated SCC of FR1 associated with SN, interruptions may also affect the serving cells associated with MN. Therefore, for EN-DC or NGEN-DC, the configured subsets of the SMTC durations for measurement object(s) on FR1 can be transferred from SN to MN.

For NE-DC, MN provides NR access. So, the MN can configure the subset of the SMTC durations per measurement object. For NE-DC, MN can operate on FR1 and FR2, while SN can only operate on FR1. When performing measurement on deactivated SCC of FR1 associated with MN, interruptions may also affect the serving cells associated with SN. Therefore, for NE-DC, the configured subsets of the SMTC durations for measurement object(s) on FR1 can be transferred from MN to SN.

For NR-NR-DC, both MN and SN provide NR access. So, both MN and SN can configure the subset of the SMTC durations per measurement object, which is configured by itself. In this case, when performing measurement on deactivated SCC associated with one node, interruptions may affect the serving cells associated with another node. Therefore, for NR-NR-DC, the configured subsets of the SMTC durations for measurement object(s) associated with one node (e.g., MN or SN) should be transferred to the other node (e.g., SN or MN).

Regarding the transfer of the subsets of the SMTC durations for measurement object over the inter-node interface, the following are two possible ways in accordance with some embodiments:

(1). The Absolute Radio Frequency Channel Number (ARFCN) of the SSB and the configured subsets of the SMTC durations are transferred over the inter-node interface, or (2). The configured subsets of the SMTC durations and the corresponding serving cell index are transferred over the inter-node interface, where the configured subsets of the SMTC durations includes:

for Approach2—Option1: the SMTC_deact,
for Approach2—Option2: SMTC, SMTC_deact_bitmap, MeasCycleSCell.

For example, the subsets of the SMTC durations configured on measurement object1 (denoted MeasObject1) and the subsets of the SMTC durations configured on measurement object 2 (denoted MeasObject2) need to be transferred from one node to the other. In this example, the ARFCN of the SSB of MeasObject1 is denoted by ARFCN-X, the ARFCN of the SSB of MeasObject2 is denoted by ARFCN-Y, the serving cell configured on the SSB of MeasObject1 as a serving cell index servCellIndex-X, and the serving cell configured on the SSB of MeasObject2 has a serving cell index servCellIndex-Y.

In accordance with this example, under Approach2—Option1, the following information can be transferred over the inter-node interface to indicate the subset of the SMTC duration:

{item1: ARFCN-X, SMTC_deact of MeasObject1,
item2: ARFCN-Y, SMTC_deact of MeasObject2}
or,
{item1: servCellIndex-X, SMTC_deact of MeasObject1,
item2: servCellIndex-Y, SMTC_deact of MeasObject2}.

In accordance with this example, under Approach2—Option2, the following information can be transferred over the inter-node interface to indicate the subset of the SMTC duration:

{item1: ARFCN-X, (SMTC, SMTC_deact_bitmap, MeasCycleSCell) of MeasObject1,
item2: ARFCN-Y, (SMTC, SMTC_deact_bitmap, MeasCycleSCell) of MeasObject2}
or,
{item1: servCellIndex-X, (SMTC, SMTC_deact_bitmap, MeasCycleSCell) of MeasObject1,
item2: servCellIndex-Y, (SMTC, SMTC_deact_bitmap, MeasCycleSCell) of MeasObject2}.

In NR, the gNB may be operating in a Central Unit (CU) and Distribution Unit (DU) split mode. In this case, the configured subsets of the SMTC durations received over the MN and SN interface can also be transferred from CU to DU.

In some embodiments, configurations relating to a long MeasCycleSCell are different than a short MeasCycleSCell, illustratively:

For a Long MeasCycleSCell

In accordance with Approach1: when performing measurements on deactivated SCC with configured MeasCycleSCell of X(sf) or larger, a UE is only allowed to cause interruptions to serving cells which are in the same FR as the deactivated SCC, or In accordance with Approach2: when performing measurements on deactivated SCC with configured MeasCycleSCell of X(sf) or larger, a UE is only allowed to cause interruptions (a) to serving cells which are in the same FR as the deactivated SCC and (b) in accordance with the configured subset of the SMTC durations.

For a Short MeasCycleSCell

If a short MeasCycleSCell is configured, whether to allow interruption when performing measurements on deactivated SCC depends on NW control. Illustratively, a UE can report whether it can benefit on power consumption using one of the following alternatives:

Alt1: the UE reports a single indication (e.g., benefitsFromInterruption) to the NW.

Alt2: the UE reports two separate indications (e.g., two separate benefitsFromInterruption's) to the NW, one for FR1 and the other for FR2.

More specifically, in accordance with Alt1 (e.g., using a single benefitsFromInterruption indication), in response to receiving the benefitsFromInterruption set to TRUE, the MN can determine whether interruption is allowed. If interruption is allowed, the MN can set an indication (e.g., allowInterruptions) to TRUE and send it to the UE.

If the allowInterruptions is set to TRUE, in accordance with Approach1: when performing measurements on the deactivated SCC, the UE is only allowed to cause interruptions to serving cells which are in the same FR as the deactivated SCC.

If the allowInterruptions is set to TRUE, in accordance with Approach2: when performing measurements on deactivated SCC, the UE is only allowed to cause interruptions (a) to serving cells which are in the same FR as the deactivated SCC and (b) in accordance with the configured subset of the SMTC durations.

In the case of Approach2, for EN-DC, NGEN-DC, or NR-NR-DC, MN can also transfer the allowInterruptions to SN. In response to receiving the allowInterruptions, if the allowInterruptions is set to TRUE, the SN can configure the subset of the SMTC durations per measurement object. For instance, the SN can configure the subset of the SMTC durations per measurement object on FR1 and FR2.

In accordance with Alt2 (e.g., using separate benefitsFromInterruption indications for FR1 and FR2), in response to receiving the separate benefitsFromInterruption indications, the NW (e.g., via one or more base stations) sets separate indications (e.g., separate allowInterruptions) for FR1 and FR2 respectively. For example:

For EN-DC or NGEN-DC, the MN determines whether interruption on FR1 is allowed. If interruption is allowed, the MN sets an indication allowInterruptions-fr1 to TRUE and sends it to the UE. The SN determines whether interruption on FR2 is allowed. If allowed, the SN sets a separate indication allowInterruptions-fr2 to TRUE and sends it to the UE. In the case of Approach2, the MN can also transfer the allowInterruptions-fr1 to the SN. In response to receiving the allowInterruptions-fr1, if the allowInterruptions-fr1 is set to TRUE, the SN can configure the subset of the SMTC durations per measurement object on FR1.

For NE-DC or NR-NR-DC, the MN determines whether interruption on FR1 and FR2 is allowed. If allowed, the MN sets allowInterruptions-fr1 and allowInterruptions-fr2 to TRUE and sends them to the UE. In the case of Approach2, for NR-NR-DC, the MN can also transfer the allowInterruptions-fr1 and allowInterruptions-fr2 to the SN. In response to receiving the allowInterruptions-fr1 and allowInterruptions-fr2: if the allowInterruptions-fr1 is set to TRUE, the SN can configure the subset of the SMTC durations per measurement object on FR1; if the allowInterruptions-fr2 is set to TRUE, the SN can configure the subset of the SMTC durations per measurement object on FR2.

In accordance with Approach1, if the allowInterruptions-fr1 is set to TRUE, when performing measurements of deactivated SCC on FR1, the UE is allowed to cause interruptions to serving cells which are on FR1. If the allowInterruptions-fr2 is set to TRUE, when performing measurements of deactivated SCC on FR2, the UE is allowed to cause interruptions to serving cells which are on FR2.

In accordance with Approach2, if the allowInterruptions-fr1 is set to TRUE, when performing measurements of deactivated SCC on FR1, the UE is allowed to cause interruptions (a) to serving cells which are on FR1 and (b) in accordance with the configured subset of the SMTC durations. If the allowInterruptions-fr2 is set to TRUE, when performing measurements of deactivated SCC on FR2, the UE is allowed to cause interruptions (a) to serving cells which are on FR2 and (b) in accordance with the configured subset of the SMTC durations.

FIG. 3 shows an example of a wireless communication system where techniques in accordance with one or more embodiments of the present technology can be applied. A wireless communication system 300 can include one or more base stations (BSs) 305a, 305b, one or more wireless devices (e.g., UEs or terminals) 310a, 310b, 310c, 310d, and an access network 325. A base station 305a, 305b can provide wireless service to wireless devices 310a, 310b, 310c and 310d in one or more wireless sectors. In some implementations, a base station 305a, 305b includes directional antennas to produce two or more directional beams to provide wireless coverage in different sectors.

The access network 325 can communicate with one or more base stations 305a, 305b. In some implementations, the access network 325 includes one or more base stations 305a, 305b. In some implementations, the access network 325 is in communication with a core network (not shown in FIG. 3) that provides connectivity with other wireless communication systems and wired communication systems. The core network may include one or more service subscription databases to store information related to the subscribed wireless devices 310a, 310b, 310c and 310d. A first base station 305a can provide wireless service based on a first radio access technology, whereas a second base station 305b can provide wireless service based on a second radio access technology. The base stations 305a and 305b may be co-located or may be separately installed in the field according to the deployment scenario. The access network 325 can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 4:
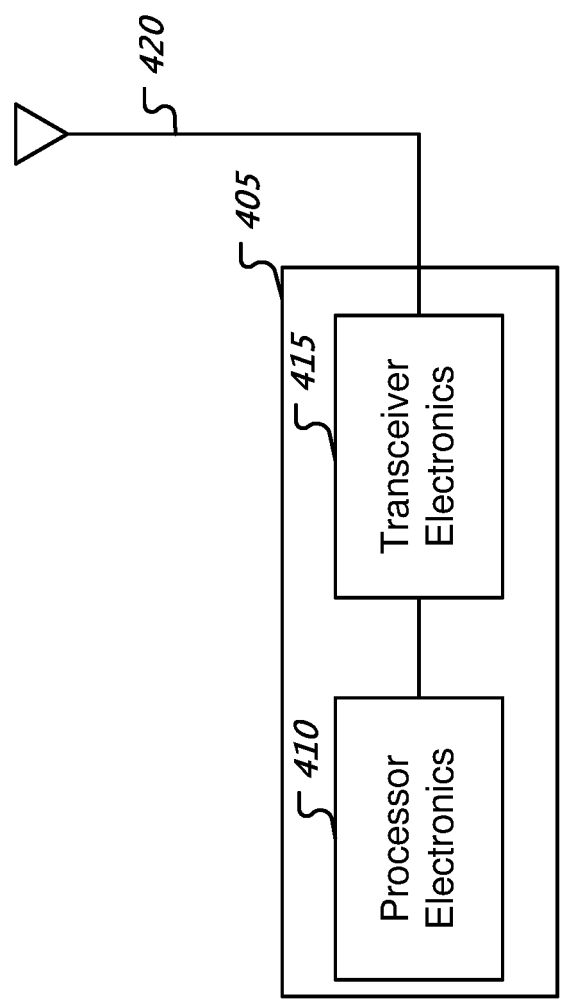
FIG. 4 is a block diagram representation of a portion of a radio station.

FIG. 4 is a block diagram representation of a portion of a radio station. A radio station 405 such as a base station or a terminal (or UE) can include processor electronics 410 such as a microprocessor that implements one or more of the wireless techniques presented in this document. The radio station 405 can include transceiver electronics 415 to send and/or receive wireless signals over one or more communication interfaces such as antenna 420. The radio station 405 can include other communication interfaces for transmitting and receiving data. Radio station 405 can include one or more memories (not explicitly shown) configured to store information such as data and/or instructions. In some implementations, the processor electronics 410 can include at least a portion of the transceiver electronics 415. In some embodiments, at least some of the disclosed techniques, modules or functions are implemented using the radio station 405.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of wireless communication, comprising:
   configuring, at a first communication node, a first Synchronization Signal/Physical Broadcast Channel block measurement timing configuration (SMTC);
   configuring, at the first communication node, based on a plurality of measurement timing occasions of the first SMTC, a second SMTC that indicates one or more measurement timing occasions at which Synchronization Signal/Physical Broadcast Channel blocks (SSBs) are measured; and
   causing, by the first communication node, a second communication node to perform deactivated secondary Component Carrier (SCC) measurement during one or more overlapping SMTC durations where the first SMTC and the second SMTC overlap each other, wherein a periodicity of the second SMTC is longer than a periodicity of the first SMTC.

2. The method of claim 1, wherein the first communication node includes a base station.

3. The method of claim 1, wherein configuring the one or more measurement timing occasions comprises configuring one or more measurement timing occasions per measurement object.

4. The method of claim 1, wherein configuring the one or more measurement timing occasions comprises configuring a bitmap to indicate the one or more measurement timing occasions.

5. The method of claim 1, wherein the first communication node provides New Radio (NR) network access in dual connection (DC) mode.

6. The method of claim 5, further comprising communicating, from the first communication node to a third communication node, the configured one or more measurement timing occasions.

7. A method of wireless communication, comprising:
   receiving, by a second communication node, a first Synchronization Signal/Physical Broadcast Channel block measurement timing configuration (SMTC), and a second SMTC that indicates one or more measurement timing occasions at which Synchronization Signal/Physical Broadcast Channel blocks (SSBs) are measured, wherein the second SMTC is determined based on a plurality of measurement timing occasions of the first SMTC, wherein a periodicity of the second SMTC is longer than a periodicity of the first SMTC and the second SMTC; and
   performing, by the second communication node, deactivated secondary Component Carrier (SCC) measurement during one or more overlapping SMTC durations where the first SMTC and the second SMTC overlap each other.

8. The method of claim 7, wherein the second communication node includes a User Equipment (UE) terminal.

9. The method of claim 7, wherein if a measurement cycle for performing the deactivated SCC measurement is longer than a threshold and if the one or more measurement timing occasions includes all of the plurality of measurement timing occasions, then the second communication node is only allowed to cause interruptions to serving cells which are in a same Frequency Range (FR) as the deactivated SCC.

10. The method of claim 7, wherein if a measurement cycle for performing the deactivated SCC measurement is longer than a threshold and if the one or more measurement timing occasions are fewer than the plurality of the measurement timing occasions, then (a) the second communication node is only allowed to cause interruptions to serving cells which are in a same frequency range (FR) as the deactivated SCC and (b) the second communication node is only allowed to cause interruptions in accordance with the one or more measurement timing occasions.

11. The method of claim 7, further comprising:
    communicating, from the second communication node to at least one of the first communication node or a third communication node, an indication of benefit.

12. The method of claim 11, further comprising:
    receiving, at the second communication node, a responding indication in response to the indication of benefit, wherein if the responding indication indicates a particular value:
    the second communication node is only allowed to cause interruptions to serving cells which are in a same frequency range (FR) as the deactivated SCC.

13. The method of claim 11, wherein the first communication node communicates to a third communication node a responding indication in response to the indication of benefit, wherein the first communication node is a master node (MN) and the third communication node is a second node (SN), both operating in at least one of E-UTRA-NR Dual Connectivity (EN-DC), NG-RAN E-UTRA-NR Dual Connectivity (NGEN-DC), or NR-NR Dual Connectivity (NR-NR-DC) mode.

14. The method of claim 7, further comprising:
communicating, from the second communication node to at least one of the first communication node or a third communication node, a first indication of benefit corresponding to a first FR and a second indication of benefit corresponding to a second FR.

15. The method of claim 14, wherein at least one of the first communication node or a third communication node determines (a) a first responding indication for responding to the first indication of benefit and (b) a second responding indication for responding to the second indication of benefit.

16. The method of claim 14, further comprising:
receiving, at the second communication node, a first responding indication in response to the first indication of benefit, wherein if the first responding indication indicates a particular value:
the second communication node is only allowed to cause interruptions to serving cells which are in the first FR.

17. The method of claim 14, further comprising:
receiving, at the second communication node, a second responding indication in response to the second indication of benefit, wherein if the second responding indication indicates a particular value:
the second communication node is only allowed to cause interruptions to serving cells which are in the second FR.

18. The method of claim 14, wherein the first communication node communicates to a third communication node at least one of a first responding indication for responding to the first indication of benefit or a second responding indication for responding to the second indication of benefit, wherein the first communication node is a master node (MN) and the third communication node is a second node (SN), both operating in at least one of E-UTRA-NR Dual Connectivity (EN-DC), NG-RAN E-UTRA-NR Dual Connectivity (NGEN-DC), or NR-NR Dual Connectivity (NR-NR-DC) mode.

* * * * *